JAMES MINTER.

3 Sheets--Sheet 1.

Improvement in Bolt-heading Machines.

No. 4,641.

Reissued Nov. 21, 1871.

A. Greene
P. Dickson } Jrs

James Minter Inventor
by his Attorney A. Gilchrist

AML PHOTO-LITHOGRAPHIC CO. N.Y. (OSBORNE'S PROCESS.)

3 Sheets--Sheet 2.

JAMES MINTER.

Improvement in Bolt-heading Machines.

No. 4,641.

Reissued Nov. 21, 1871.

A Greene
C Dickson } Jrs

James Minter Inv'tr
by his Attorney S.G. Arnold

AM. PHOTO-LITHOGRAPHIC CO. N.Y. (OSBORNE'S PROCESS.)

JAMES MINTER. Improvement in Bolt-heading Machines.

No. 4,641. Reissued Nov. 21, 1871.

Attest;
Edw. W. Donn
Wm. H. Blodgett

Inventor;
James Minter
per Atty A. G. Arnold

AM. PHOTO-LITHOGRAPHIC CO. N.Y. (OSBORNE'S PROCESS.)

UNITED STATES PATENT OFFICE.

JAMES MINTER, OF LOWELL, MASSACHUSETTS, ASSIGNOR TO HIMSELF, JONATHAN HOPE, AND ROBERT H. BUTCHER, OF SAME PLACE.

IMPROVEMENT IN BOLT-HEADING MACHINES.

Specification forming part of Letters Patent No. 43,521, dated July 12, 1864; reissue No. 2,093, dated October 17, 1865; reissue No. 4,641, dated November 21, 1871.

*To all whom it may concern:*

Be it known that I, JAMES MINTER, of Lowell, (formerly of Worcester,) in the county of Middlesex and State of Massachusetts, have invented a new and Improved Bolt-Heading Machine, of which the following is a specification:

My invention relates to a machine for heading bolts, in which the bolts are held by suitable means while exposed to the successive action of a series of formers or dies acting on the sides and top of the head. These dies are adjustable to make heads of different sizes and shapes, and are operated by hinged spring-dogs, which are connected to a foot-lever in such a manner that by stepping on the same one pair of the side dies is caused to act first on two opposite sides of the head, and afterward the other pair is made to operate on the other two opposite sides, and finally the vertical die is set in motion and caused to act on the top of the head, by which means the head is made and its top and sides smoothed without the necessity of moving the bolt; said foot-lever or mechanism is connected to a guide-lever, the position of which is determined by a groove in the circumference of a revolving drum, in such a manner that it is prevented from throwing the dies into operation at the wrong time, and the connection between the foot-lever and the driver of the heading-die is made by means of a spring-rod, and a yielding bolster is inserted between said driver and its crank-shaft in such a manner that in case said driver meets with undue resistance it is allowed to yield and thus prevent injury to the machine.

Figure 1:
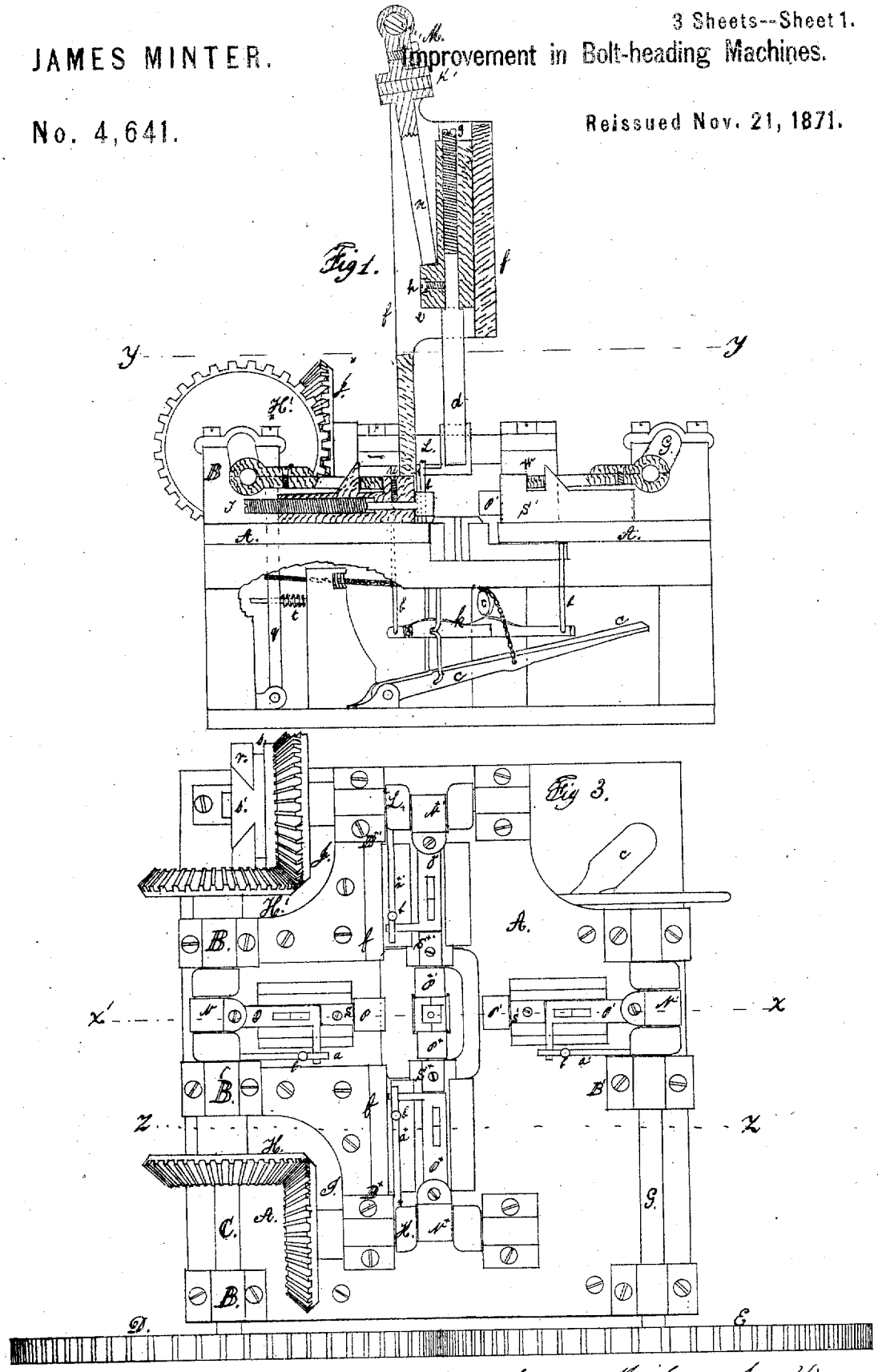
Figure 2:
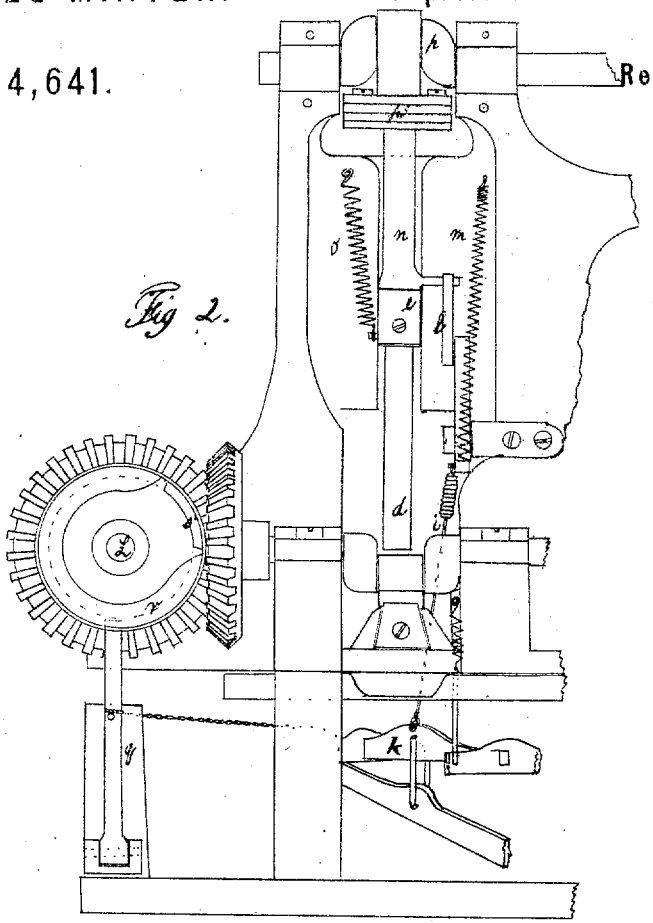
Figure 4:
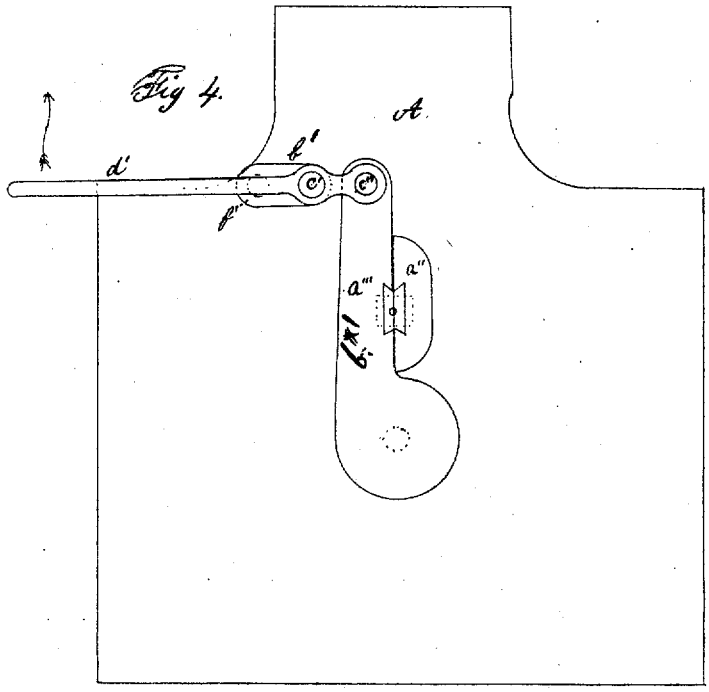
Figure 5:
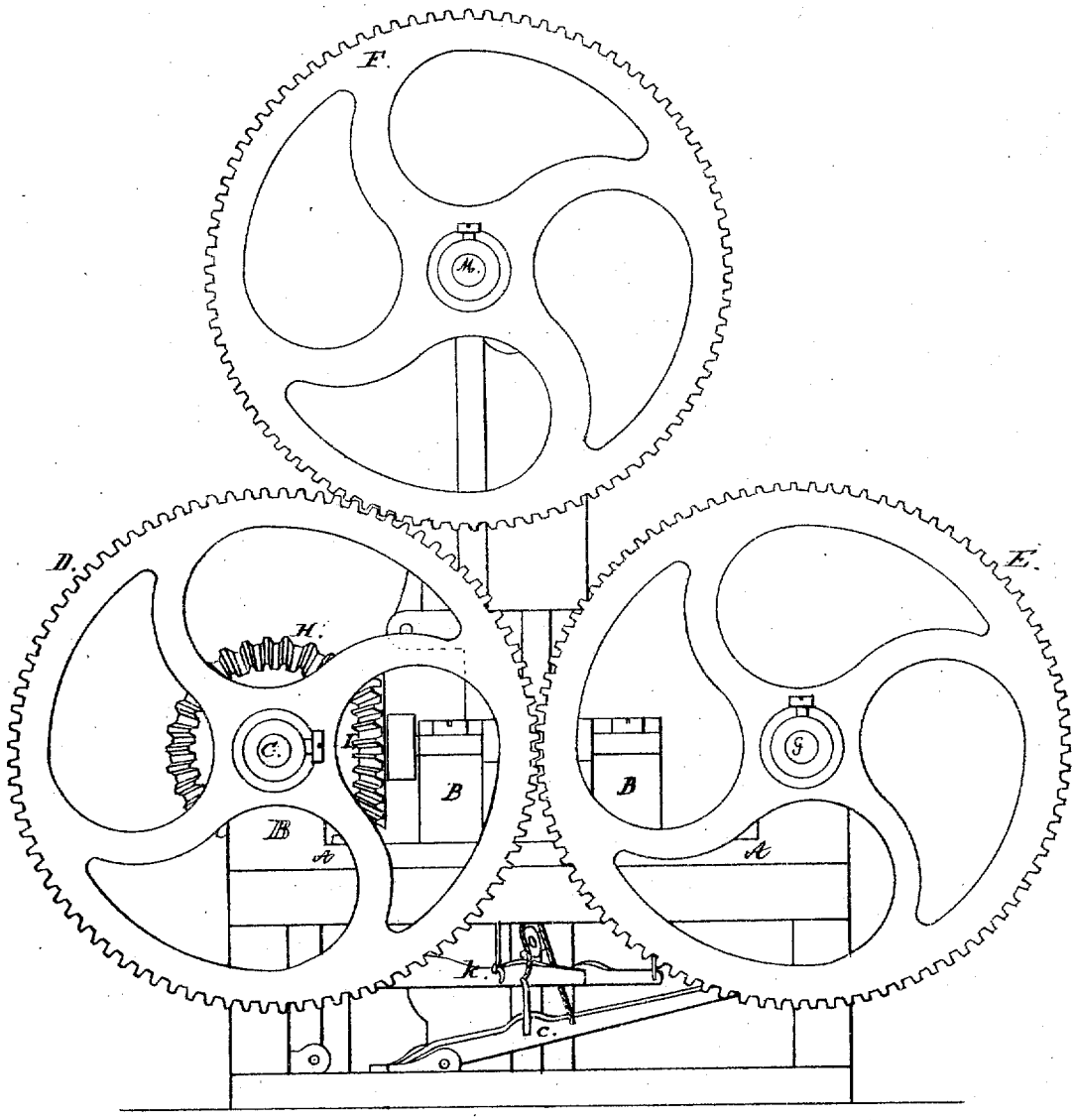

Figure 1 represents a transverse vertical section of a machine embodying my invention taken in the plane indicated by the line $x^1 x$, Fig. 3. Fig. 2 is a side elevation from lines $x\,x'$ to $z\,z'$ of Fig. 3. Fig. 3 is a horizontal section on the plane indicated by the line $y\ y$, Fig. 1. Fig. 4 shows the jaws from beneath. Fig. 5 represents a front elevation of the machine.

Similar letters indicate the same parts in each.

A A represent the bed-plate of the machine, which is secured on a suitable frame or walls, and is provided with pillow-blocks, B B, which form the bearings for the driving-shaft C, and this shaft carries the large cog-wheel D, which drives two others of the same size, E and F. The wheel E is fast on the shaft G, which has bearings on the plate A. The driving-shaft has on it two bevel-gears, H H′, which gear into corresponding ones, I and J, on the shafts K and L, which have bearings on the bed-plate and run at right angles to the shafts C G, as shown in Fig. 3. The wheel F is fast on the shaft M, which has its bearings in standards rising from the bed-plate. The several shafts C, G, K, and L are provided with cranks N N′ N× N×′, which move the dogs O O′ O× O×′, by the action of which motion is given to the dies P P′ P× P×′, which dies are inserted in carriages S S′ S× S×′, which move between suitable guide-ways fast to the bed-plate A, and are adjustable by means of the screws T bearing on the end of the heading-tools, and are held in any desired position by the set-screw $u$ or similar means, as shown in Fig. 1, where one of the carriages is shown in section. Each of the carriages is provided with a lug passing through the corresponding dog, by which the latter is enabled to draw the carriage back, and with a shoulder, $w$, against which the dog bears to push the carriage forward. The inner ends of the dogs are bent at right angles and project through the slotted arms $a\ a'\ a^{\times}\ a^{\times\prime}$, which are hinged to the blocks B B′ B× B×′, and connected by the rods $b\ b\ b\ b$ to the piece $k$, formed somewhat in the shape of the letter H, in order that its extremities may be nearly under the arms, the middle of which is attached to the lever $c$. Suitable springs are placed under the arms to raise them, and with them the dogs, clear of the shoulders, except when the lever is depressed, when the dogs are brought down and give motion to the dies. The heading-die $d$ is inserted in a carriage, $e$, which moves in suitable guide-ways attached to the standards $f\,f$, and is adjustable by the screw $g$ and set-screw $h$, similar to the other dies. The carriage is operated by a dog, connected by suitable levers, and spring-rod $i$, with the piece $k$, as shown in Fig. 2. This connection is made yielding to allow the foot-lever to throw in the other dogs independently of this one, and it is accomplished thus: The lever $c$ is partially pressed down about half its movable distance, which will cause the side dies to be put in operation independently of the vertical die, which will be put in operation only when the lever is pressed down its whole movable distance, or nearly so. Thus it will be seen that by working the lever the side dies may be caused to operate two or more times to each operation of the vertical die if desired, and the vertical die may be made to operate at intervals, regular or irregular, at the will of the operator. When the foot-lever is released the spring *m* acts on the horizontal arm of the elbow-lever *l*, whose perpendicular arm is connected to the dog *n*, and thus throws the dog off the shoulder, and the carriage is raised by the spring *o*. The dog is connected to the crank *p* by a journal-box, and between this box and the top end of the dog a thick piece, *p'*, of elastic material, is inserted, so that in case the heading-die meets undue resistance the dog is allowed to yield and thus injury to the mechanism is prevented. The foot-lever *c* is suitably connected to a hinged lever, *q*, located in such a position that its end or point stands in front of the cam *r* on the shaft L, which cam has a groove, *s*, around it, to which the lever has access only through a recess, *s'*. A spring, *t*, throws the point of the lever clear of the cam, and when the foot-lever is depressed the lever *q* strikes the cam and the foot-lever is held from going low enough to set the dogs into operation until the cam turns the recess to the point of the lever, when it can enter the groove *s* and thus allow the foot-lever to descend, and with it the dogs, thus insuring their action at the proper time. The bolt to be headed is held by the jaws *a'' a'''*, one of which is stationary, while the other is secured to a lever, $b^{\times\prime}$, pivoted under the bed-plate A, and connected by a pivot, *c''*, to a hand-lever, *d'*. (See Fig. 4.) This hand-lever has its fulcrum on a pivot, *c'*, in the loose end of the arm *b'*, which is attached to the bed-plate by the pivot *f'*. By moving the hand-lever in the direction of the arrow in Fig. 4 the swivel-arm turns out in the same general direction and the jaws open. By moving the hand-lever in the opposite direction the swivel-arm is brought in line with the lever, as shown in Fig. 4, and the jaws are closed. It will be noticed that the lever and arm form a toggle-joint which forces the jaws together, so that they hold the shank of the bolt firmly, and which also prevents their opening until the lever is moved. The jaws form an abutment to upset the metal in line with the axis of the bolt, which upsetting is produced by the pressure of the vertical die on the top of the bolt-head. In this machine the bolt remains stationary while the head is formed by the dies, and by these means the jaws are prevented from the constant wear to which they are subjected in others where the bolt is revolved to present the different sides to the dies. The principle of operation, it will be seen, consists in upsetting the head by the heading-die, and in forming the sides by two pairs of dies, which finish them, while the top is finished by the action of the heading-die E repeated, if necessary. For different kinds of work it may be best to vary the order and arrangement of the dies, as to increase the number of pairs for a larger number of sides, or to alter their form to correspond to the desired head.

It will be seen that in the accompanying drawing I have shown the dies with a square face. I do not wish to be understood as claiming any particular form of the face of the die, as die-faces are constructed in various forms to act upon the various forms of heads to be made. Neither do I wish to be understood as confining my invention to any particular known form of die-face, as any form can be applied and operated by my machine without changing the operating mechanism, and what is called a T-head may be made by setting one pair of dies forward and the other back, and the L-head or one-sided head by setting three up and one back. These and other modifications will readily suggest themselves in adapting the principles of my invention to work of various kinds.

What I claim as new, and desire to secure by Letters Patent, is—

1. The combination of the vertical heading-die and the side dies, acting in pairs, substantially as described.

2. The heading-die for upsetting the metal in line with the axis of the bolt, in combination with the side dies, acting in pairs, and the jaws, substantially as and for the purposes set forth.

3. The side dies P, P', $P^{\times}$, $P^{\times\prime}$, and *d*, in combination with their respective carriages and adjusting-screws or their equivalents, whereby they are adjusted to make heads of different sizes and shapes.

4. The combination of the vertical carriages and side carriages with mechanism to reciprocate said carriages and their adjustable-dies, substantially as described.

5. The mechanism herein described, by means of which the heading-dies of a bolt-heading machine may be made to operate at regular or irregular intervals, at the will of the operator, substantially as herein set forth.

6. The spring-dogs O O' $O^{\times}$ $O^{\times\prime}$, carriages *s*, with their shoulders and their dies P P' $P^{\times}$ $P^{\times\prime}$, in combination with the piece *k* or its equivalent, and the foot-lever *c*, when constructed and operating substantially as set forth.

7. The combination of the elastic plate *p* with the dog *n* and the heading-die *d*, as set forth.

8. The lever *q* and cam *r*, in combination with a foot-lever *c* and the forming mechanism, as described, so that said cam shall control the time of action, as set forth.

9. The combination of the hand-lever *d'*, swivel-arm *b'*, and movable jaw *a'''*, when constructed and operating substantially as and for the purposes set forth.

JAMES MINTER.

Witnesses:
CHAS. A. F. SWAN,
F. W. SARGENT, Jr.

(14)